(12) United States Patent
Scherzer et al.

(10) Patent No.: US 7,881,313 B2
(45) Date of Patent: *Feb. 1, 2011

(54) SPACE-TIME-POWER SCHEDULING FOR WIRELESS NETWORKS

(75) Inventors: Shimon B. Scherzer, Sunnyvale, CA (US); Patrick A. Worfolk, Campbell, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 1327 days.

This patent is subject to a terminal disclaimer.

(21) Appl. No.: 11/404,309

(22) Filed: Apr. 14, 2006

(65) Prior Publication Data

US 2006/0182077 A1   Aug. 17, 2006

Related U.S. Application Data (63) Continuation of application No. 10/306,972, filed on Nov. 27, 2002, now Pat. No. 7,031,336.

(60) Provisional application No. 60/406,165, filed on Aug. 26, 2002.

(51) Int. Cl.
  *H04L 12/28* (2006.01)
(52) U.S. Cl. .................. 370/401; 370/338; 370/328

(58) Field of Classification Search .................. None
See application file for complete search history.

(56) References Cited

U.S. PATENT DOCUMENTS

| | | | |
|---|---|---|---|
| 5,621,752 A * | 4/1997 | Antonio et al. | 375/144 |
| 6,141,336 A | 10/2000 | Bauchot et al. | |
| 6,304,552 B1 | 10/2001 | Chapman et al. | |
| 6,519,636 B2 | 2/2003 | Engel et al. | |
| 6,556,817 B1 | 4/2003 | Souissi et al. | |
| 6,795,409 B1 | 9/2004 | Youssefmir et al. | |
| 6,839,573 B1 * | 1/2005 | Youssefmir et al. | 455/562.1 |
| 6,930,981 B2 * | 8/2005 | Gopalakrishnan et al. | 370/252 |
| 7,031,336 B2 * | 4/2006 | Scherzer et al. | 370/461 |
| 7,092,373 B2 * | 8/2006 | Parantainen et al. | 370/337 |
| 2002/0181492 A1 | 12/2002 | Kasami et al. | |
| 2004/0235527 A1 | 11/2004 | Reudink et al. | |
| 2006/0193268 A1 * | 8/2006 | Walton et al. | 370/264 |
| 2007/0286131 A1 * | 12/2007 | Wu et al. | 370/337 |

* cited by examiner

*Primary Examiner*—Duc C Ho (57) ABSTRACT

A technique is disclosed to schedule frame transmissions in a wireless local area network. The network includes a plurality of stations configured to communicate on the same frequency channel with a plurality of access points. A central controller examines the transmission characteristics between the various stations and access points and identifies frames that may be simultaneously transmitted by a subset of the access points to their intended stations.

20 Claims, 6 Drawing Sheets

SPACE-TIME-POWER SCHEDULING FOR WIRELESS NETWORKS

RELATED APPLICATIONS

This application is a continuation of prior application Ser. No. 10/306,972, filed Nov. 27, 2002 now U.S. Pat. No. 7,031, 336, which application was based on and claimed priority to U.S. Provisional Application Ser. No. 60/406,165, filed Aug. 26, 2002.

BACKGROUND

1. Field of the Invention

The present invention relates to wireless networks, and more particularly, to space/time/power RF routing for such networks.

2. Related Art

Wireless local networks (WLANs) based on the IEEE 802.11 standard have proven to be popular. IEEE 802.11 is a wireless standard related to the IEEE 802.3 standard established for wired Ethernets. In contrast to wired networks, an IEEE 802.11 WLAN must conserve the limited bandwidth presented by a wireless transmission medium. Accordingly, a set of rules in the IEEE 802.11 standard is dedicated to medium access control (MAC), which governs accessing the wireless medium and sending data through it.

In an IEEE 802.11 WLAN, multiple wireless nodes or stations (STAs) such as laptops may communicate through an access point (AP) with other users of a wired local area network (LAN). To avoid medium access contention among STAs and APs, the MAC specifies a carrier sense multiple access/collision avoidance scheme (CSMA/CA) as controlled by a distribution coordination function (DCF).

Similar to Ethernet operation, the DCF first checks that the radio link is clear before transmitting. If another transmission is detected, the DCF specifies a random backoff period (DCF inter-frame space or DIFS). Only if the channel is clear after the expiration of the random time period, may a STA begin transmission. Because two STAs may communicate with a given AP but be out of range with respect to each other, the DCF also specifies a virtual carrier sense (VCS) procedure by which the wireless medium is reserved for a specified period of time for an impending transmission. For example, the VCS may be implemented by the use of request-to send (RTS) and clear-to-send (CTS) frames. A given STA would signal the beginning of a transmission with an RTS which specifies a reservation period. Although other STAs may be out of range from this RTS, the AP responds with a CTS that will be received by the remaining STAs. This CTS will communicate the reservation period to all the STAs, which update their Network Allocation Vector (NAV) accordingly. The NAV acts as a timer for the reservation period and protects data transmissions by causing the medium to be non-idle over the duration of the entire frame exchange.

While DCF with CSMA/CA reduces the possibility of collision, it does not eliminate it due to "hidden stations" reality. Further, DCF is not suited for time-sensitive applications because of the unbounded delays in the presence of congestion or interference. DCF may also under-utilize available bandwidth due to access contention. This inefficiency is increased because of the excessive overhead and the low data rate at which the preamble and PLCP header are transmitted. When this is used with RTS/CTS (Request to Send/Clear to Send) control frames, e.g., to handle the "hidden" station problem, inefficiency is increased even further.

If greater bandwidth utilization is desired, another type of medium access control called the Point Coordination Function (PCF) may be implemented. PCF specifies the use of special stations in APs denoted as point coordinators, which act to ensure contention-free (CF) service. PCF is a centrally based access control mechanism (as opposed to a distributed architecture) based on a polling and response protocol, where DCF is based on CSMA/CA. During a contention free period (CFP), a STA can only transmit after being polled by the Point Coordinator (PC). The PC may send polling frames to STAs that have requested contention-free services for their uplink traffic. If a polled STA has uplink traffic to send, it may transmit one frame for each polling frame received. The PC expects a resonse within a short inter-frame space (SIFS), which is shorter than a priority inter-frame space (PIFS).

However, PCF also has limitations, especially in WLANs with large numbers of STAs and APs, e.g., in an enterprise application. With today's needs, it is desirable to expand the coverage areas for 802.11 WLANs, e.g., networks such as offices are expanding in size. However, current 802.11 networks utilizing DCF and PCF are limited in their scalability to these larger networks, e.g., enterprise, as will be discussed below. Enterprise, as used herein, refers to networks having numerous APs and STAs in large physical areas.

One limitation of PCF is that since the CFP repetition rate is not dynamically variable, there is a trade-off between low latency applications requiring a fast repetition rate and an efficient use of the medium requiring slower repetition rate. Also, the start of a CF period is not exactly periodic (i.e., it can only begin when the medium is sensed to be idle). As a result, the CFP may be forced to end before serving some STAs on the polling list. Further limitations may be that all the CF-pollable APs have the same level of priority since they are simply polled by ascending Association ID (AID), and the PC has to poll all the STAs on its polling list even if there is no traffic to be sent.

Figure 1A:
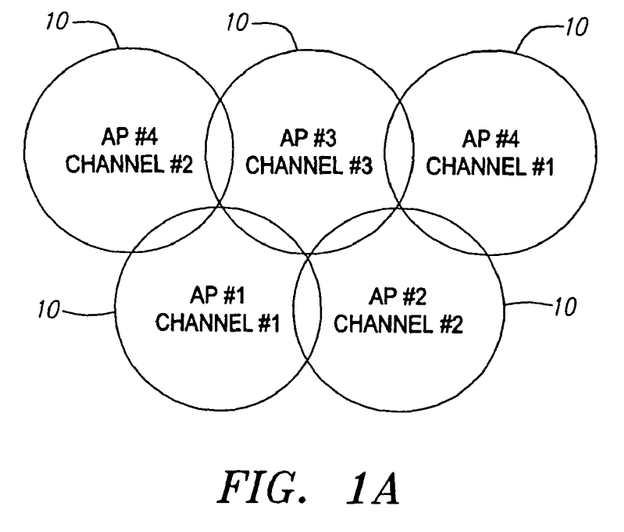
FIG. 1a illustrates cells with theoretical footprints for a conventional WLAN.

In addition to governing medium access, DCF also specifies rules for the frequency scheme that may be implemented in a WLAN having multiple APs. For example, FIG. 1a shows a WLAN having coverage areas or cell 10 corresponding to four APs. To minimize contention between adjacent APs, each AP is assigned a frequency channel for its cell 10. FIG. 1a shows that the overlap of cell 10 allows complete coverage within the WLAN.

IEEE 802.11 WLAN suffers from the rigidity required by the DCF. In addition, FCC regulations limit the amount of power that can be used by the APs and STAs. The DCF rigidity and power allocation limits present severe challenges to users during network deployment and modification. Even if careful network planning is implemented, there may still be loss of bandwidth due to unpredictable circumstances such as a subscriber's movement and activity level. In addition, the overall network bandwidth is limited by non-adjacent cell interference such that cells cannot be readily reduced in size to boost bandwidth. Moreover, because frequency channels are used for interference-avoidance planning, cell bandwidth is limited to a single AP bandwidth. When external interference is present, system frequency cannot be easily changed since the frequency resource already been used for another purpose.

Network bandwidth cannot be easily allocated to areas of high demand (such as conference rooms). Finally, as with any segregated medium, the DCF rigidity leads to a loss of trunking efficiency.

For example, FIG. 1a illustrates an ideal situation where each cell 10 has a circular coverage area. However, in reality, the coverage area of each cell 10 is not a circle. For example, in an enterprise application, such as in a building with large numbers of walls and offices, numerous APs and STAs are needed to allow STAs to transfer information between each other. The walls and other barriers result in non-uniform coverage areas for each cell 10.

Figure 1B:
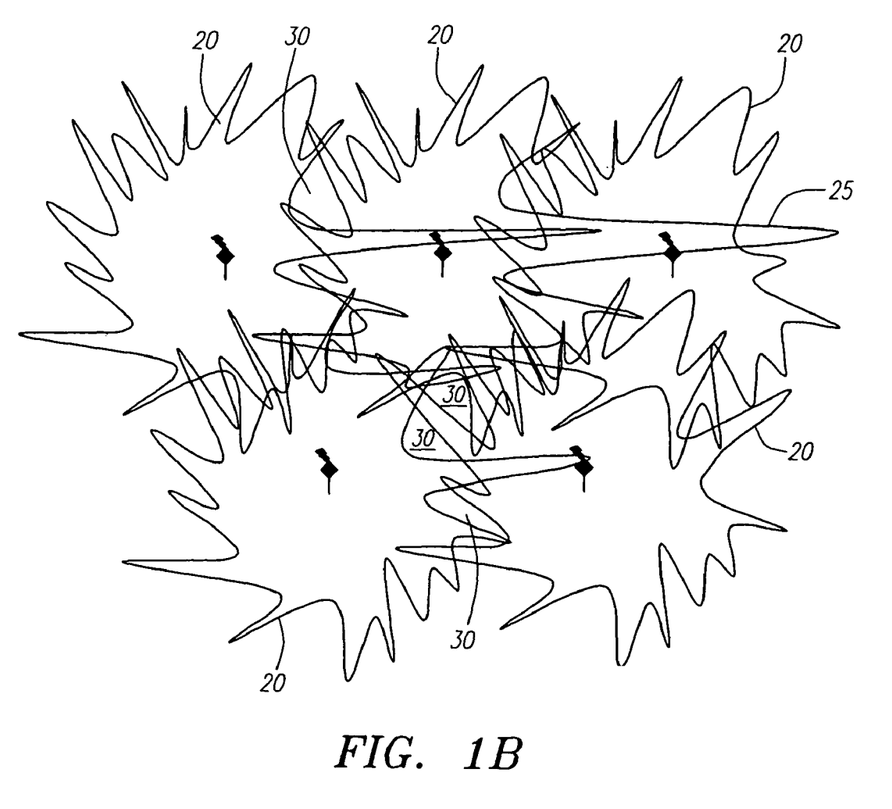
FIG. 1b illustrates an example of cells with realistic footprints in an enterprise.

FIG. 1b shows coverage areas or cells 20 in a practical WLAN environment. As seen, the coverage areas are no longer uniform circles, but are irregular having areas of broader coverage (the peaks) and areas of lower coverage (the nulls). For example, long peaks 25 may correspond to long hallways in the building. Because cells 20 do not have uniform coverage, "holes" 30 exist in the network, where communication is not possible. Holes 30 do not necessarily represent areas where no frames are able to be sent and received, but rather only a small percentage of dropped frames are all that may be tolerated due to TCP/IP behavior, thereby effectively ending communication ability within that area.

A possible solution to "fill" holes 30 may be to increase the density of the APs in the WLAN, i.e., move the APs closer to each other, which requires more APs for the same outer coverage area. However, increasing the density of the APs will result in increased interference between APs and STAs, while also increasing the cost of the system. Consequently, in order to reduce interference, the transmit power of the APs must be reduced. But, this may again result in holes in the WLAN coverage due to irregular coverage "footprints" of the APs at an additional cost of a reduction in maximum throughput of the system.

Accordingly, there is a need in the art for improved techniques to enhance cell coverage, eliminate the need for cell-based frequency planning, and increase network effective bandwidth and trunking efficiency in WLANs, especially in enterprise.

BRIEF SUMMARY OF THE INVENTION

In accordance with one aspect of the invention, a wireless local area network (WLAN) includes a plurality of M access point (AP) transceivers, wherein each access point transceiver controls its own multi-element antenna. The network includes a plurality of N stations (STAs), wherein each station can communicate with all or a subset of the M access point transceivers. In addition, a central controller or radio frequency (RF) router is coupled to the plurality of M access points and is configured to examine the "transmission characteristics" between a subset of the stations and a subset of the antennas for each access point. Transmission characteristics include path losses between transmitter and receiver, transmission power, receive signal level, ratio between one transmission path loss and another, and other types of suitable information metrics. Based upon these transmission characteristics, the controller identifies frames that may be scheduled for simultaneous transmission from a subset of the access points to a subset of the stations, such that a given access point in the subset is uniquely assigned a given frame for simultaneous transmission to its intended station with high probability of delivery.

In one embodiment, transmission characteristics include the relative path loss between APs to STAs and between APs to APs and the probability of interference from STA to another STA (estimated from the relative path loss). The relative path loss characteristics are also known collectively as a spatial signature. The transmission characteristics are based on signals at the receiving STA and/or AP. Thus, when the controller has the transmission characteristics of the APs and STAs within the network, it can select the best AP with which to transmit the frame to the appropriate STA. Selection metric is based on best signal delivery path and minimum interference to co-existing transmissions. If frame transmission, regardless of the AP selected, would interfere with an existing transmission, the controller may decide to hold the frame a fixed period of time until conditions change or drop the frame entirely.

A plurality of such networks can be utilized to create a larger system, with each network operating on its own unique frequency channel.

By providing the controller with the transmission characteristics information and allowing the controller to select from multiple APs to transmit frames to multiple APs on a single frequency channel, system performance can be significantly improved. For example, the probability of having an outage is greatly reduced, the range can be extended (from having the ability to select one of many APs instead of relying on just one AP), bandwidth is increased, interference is reduced, and system cost is lowered.

The present invention exploits the natural large path-loss variability within indoor environments. This variability, for example, is a result of extensive shadowing caused by walls and other objects and signal propagation through hallways and air ducts. In addition, extensive signal multipath propagation cause Rayleigh fading that further contributes to signal level variations.

The invention will be more fully understood upon consideration of the following detailed description, taken together with the accompanying drawings.

BRIEF DESCRIPTION OF THE DRAWINGS

Use of the same or similar reference numbers in different figures indicates same or like elements.

DETAILED DESCRIPTION

Figure 2:
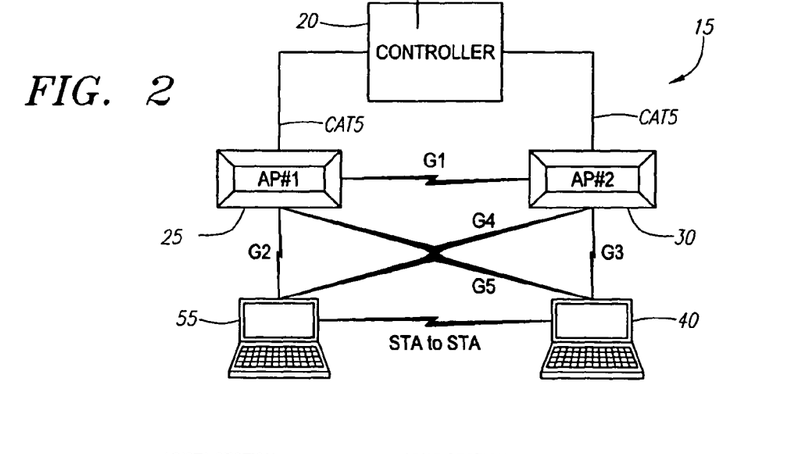
FIG. 2 is a block diagram of a WLAN according to one embodiment of the invention.

FIG. 2 shows a block diagram of an exemplary IEEE 802.11 WLAN 15 configured to implement the space-time-power (STP) frame scheduling technique of the present invention. A central controller 20 controls the medium access by a plurality of M access points (APs) (for illustration clarity, only two APs 25 and 30 are shown in FIG. 2). Controller 20 may also be referred to as a router, an RF router, or radio processor. Each AP may communicate with a plurality of N stations (STAs) (again, for illustration clarity, only two STAs 35 and 35 are shown in FIG. 2). STAs may include laptop PCs and handheld devices, such as PDAs. These devices can be mobile, portable, or stationary. AP devices also contain 802.11 conformant MAC and PHY interface to the wireless medium and provide access to a distribution system for associated stations.

Each AP 25 and 30, in one embodiment, may transmit on the same frequency channel. The combination of APs 25 and 30 and STAs 35 and 35 form a basic service set (BSS), which is a group of stations that communicate with each other on the same frequency channel through a group of access points, according to one embodiment. In another embodiment, each AP creates its own BSS so that each AP has a unique BSSID. Although a STA is associated with a specific AP, multiple APs can feed a single STA by setting the BSSID values to the same as that of the AP with which the STA is associated with.

As described above, a conventional IEEE 802.11 AP will refrain from transmission based on normal DCF access control using NAV condition and power detection. However, in WLAN 15, central controller 20 controls transmission by APs 25 and 30 based upon the predetermined probability that a given transmission will be successful (AP to STA and STA to AP). For example, this predetermined probability may be based upon a prediction of the signal-to-interference or channel-to-interference (C/I) ratio at the intended STA.

The variability in RF path loss between APs 25 and 30 may be increased by having each AP 25 and 30 use a multi-element array. In turn, the enhanced variability in RF path loss increases the likelihood that central controller 20 may schedule simultaneous frame transmissions without interference. The RF path loss variability is enhanced by the inherent large variance in typical WLAN environments (such as within an indoor office) due to shadowing and Rayleigh fading.

Central controller 20 executes a scheduling algorithm that exploits knowledge of transmission characteristics between each STA 35 and 35 and the multi-antenna elements of each AP 25 and 30 to maximize the number of STAs that can be simultaneously served and the amount of data transferred at each given time slot. To allow for simultaneous transmissions in a single frequency channel, each STA 35 and 35 should be well illuminated by a given AP 25 or 30. In addition, the illumination from interfering APs should be minimized.

Figure 3:
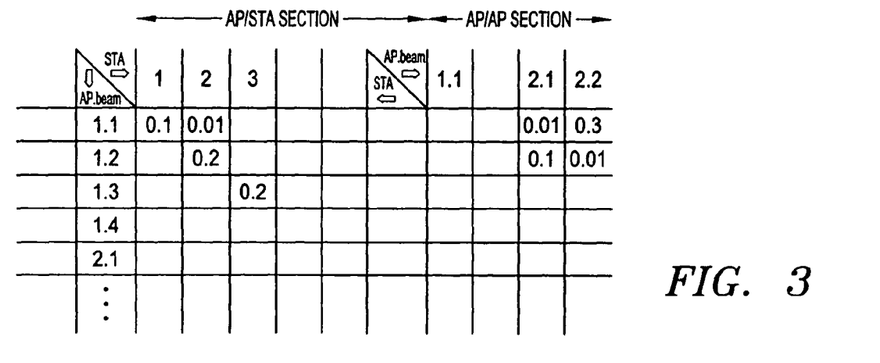
FIG. 3 is an illustration of a channel gain matrix according to one embodiment of the invention.

To achieve these goals, central controller 20 may form a channel gain matrix, which may also be denoted as the spatial signature matrix. An example of a channel gain matrix 50 for a WLAN having multiple APs and STAs is shown in FIG. 3. Channel gain matrix 50 includes all channel gains/signal strengths between each AP antenna element/beam and each STA (in the AP/STA section) and the channel gains between each AP antenna element/beam and neighboring AP antenna elements/beams (in the AP/AP section). Central controller 20 may use the channel gain matrix to schedule the transmissions by APs 35 and 40. Because of the relationship between a received signal strength and the corresponding channel gain, channel gain matrix 50 may also be denoted as a signal strength matrix.

Central controller 20 may obtain its channel gain matrix by collecting signal level values as received by APs 25 and 30. Generally, these signal values can be obtained at the corresponding APs by listening to each STA on the transmission. If a specific STA has not been active for an extended period, central controller 20 may stimulate STA transmission by forcing an AP to issue an RTS (Request to Send or any other frame inducing ACK transmission by STA) (in normal DCF mode) or by polling (in PCF mode). This forced transmission is denoted as probing and will be explained further herein. From time to time, central controller 20 may direct a given AP to stay in listening mode during the downlink period so it can estimate its channel gain relative to the remaining APs to update the AP/AP section of the channel gain matrix.

The frame preamble transmitted by each STA and AP can simplify the collection of signal strength values and signal-to-noise ratio or channel-to-interference ratio (C/I) estimation. Because the structure of a preamble is well known to each receiver, a matched filter can be used to accurately determine the strength and timing of the incoming transmission. If the preamble was received on multiple APs (or antenna beams in separate APs), central controller 20 may require that the frame will be demodulated by a single AP. By correlating the time of the demodulated frame with the time of the measured preambles, central controller 20 can associate the "preamble signature" with a specific STA. Because a matched filter may be used for signal strength estimation, the preambles may be measured even in the presence of other signals arriving at the APs. (Cross correlation may be used in place of a matched filter approach.) Due to the processing gain, preamble detection may occur under conditions of low C/I where demodulation will not occur. Accordingly, there may be two types of preamble detection: with and without demodulation. This allows for preamble detection at an AP from many STAs and other APs that are beyond the communication range (e.g., too great a path loss) as well as in the presence of interference. The measured signal strength from this preamble detection of frames received from other STAs or APs at all the beams/antenna elements of a given AP may be denoted as the spatial signature vector (or in short: spatial signature) of these other devices. The aggregation of this information for all the STAs and APs is the channel gain matrix, which may also be denoted as a spatial signature matrix.

A preamble may be detected without demodulation for a number of reasons, such as Forward Error Correction (FEC) failure, insufficient C/I to even attempt demodulation, or preemption by demodulation of another frame. A detection of frame preamble without demodulation provides an AP with information that includes the receiving antenna element, the preamble start time, the signal strength, and the C/I. An educated guess may then be made as to the source STA of this preamble so that its spatial signature may be updated. For example, the start time of a preamble detection may be matched to the start time of a valid frame demodulation to determine the source. Because the start time of valid frame demodulations can only be known after the complete packet is received, a certain amount of latency is required. As a result, preamble detections may be queued in the order of arrival until they can be matched to corresponding frame demodulations.

If the preamble detection occurs with demodulation, the available information includes the source BSS identification number, STA identification number or AP identification number, the receiving antenna element, preamble start time, signal strength, and C/I. If the source STA or AP is part of the relevant BSS, then the corresponding spatial signature may be updated as a "high" confidence update. Updates to the spatial signature vector based on preamble detections without demodulation, i.e., matching the start time of a preamble detection with the start time of a valid frame demodulation, are "low" confidence updates since there is a possibility the match is in error.

Although preambles are convenient for determining the spatial signature matrix, cross-correlation of entire packets may also be used to build this information. Cross-correlation may be used to perform entire packet detection on any packets whose content is substantially known, e.g., acknowledgement (ACK) and Clear-to-Send (CTS). Both MAC frames are 14 octets long. The power management bit in the frame control field is the only bit unknown to the receiver (the value of this bit also determines the FCS). Coordinated scheduling by the central controller can take advantage of cross-correlation packet detection and allow other communications which would interfere with frame demodulation during the time an AP performs cross-correlation packet detection.

As explained above, there may be two types of updates to a spatial signature: high or low confidence. Scheduling of frames on the downlink from APs to STAs may or may not account for such confidence values. In one embodiment, an assumption may be made that the error rate on low confidence measures is sufficiently low such that low confidence values may be used the same as high confidence values. Each entry in the spatial signature matrix consists of a set of the most recently measured signal strengths. The set may comprise the 16 most recent measurements, according to one embodiment. The central controller may construct a histogram out of the measurements and select the mode of the distribution. Ties may be broken by determining which one of the tied bins contains the more recent measurement.

In addition to the spatial signature matrix, central controller 20 may need to consider additional data before a proper frame scheduling may be effected. For example, scheduling of frames on the downlink from APs to STAs may also account for the probability that a STA transmitting an ACK on the uplink will interfere with a downlink frame going to another STA. This probability that one STA transmission will interfere with another STA reception is governed by the STA-to-STA channel gains. Assuming that terminals are not changed, a direct estimation of these gains may be impossible. However, the above-described ability to estimate the AP-to-STA channel gain provides a technique to statistically estimate the STA-to-STA interference probability. If the path loss from each STA to relatively many APs are known, the STA-to-STA interference probability can be estimated with sufficient confidence. For example, central controller 20 may examine the cross-correlation of spatial signatures vectors for two STAs. The expectation is that a pair of STAs with more highly correlated spatial signatures will likely have less path loss between them (a high STA-to-STA interference probability).

Whether the transmission of one station will interfere with the reception of another station depends both on the strength of the interference (estimated from the spatial signature) and the receiving signal strength. The strength of the interference is estimated from the cross-correlation of the spatial signatures. Highly correlated signatures indicate RF proximity and hence higher probability of interference, while low correlation indicates lower probability of interference. In the simplest model, the spatial signature cross-correlation is compared to a threshold to give a binary (0,1) probability of interference. To compensate for differences in expected received signal strength at the station (due to the varying distances of stations to access points), the threshold is maintained on a per station basis. To account for uncertainty in the estimates and lack of measurements needed to set the threshold value, the threshold is adaptive based on transmission success history. For stations which the access point re-transmits at a low rate, the sensitivity to cross-correlation related error is decreased by increasing the cross-correlation threshold. For those stations that the access point re-transmits to at a higher rate, decreasing the threshold increases the sensitivity to cross-correlation.

Figure 4:
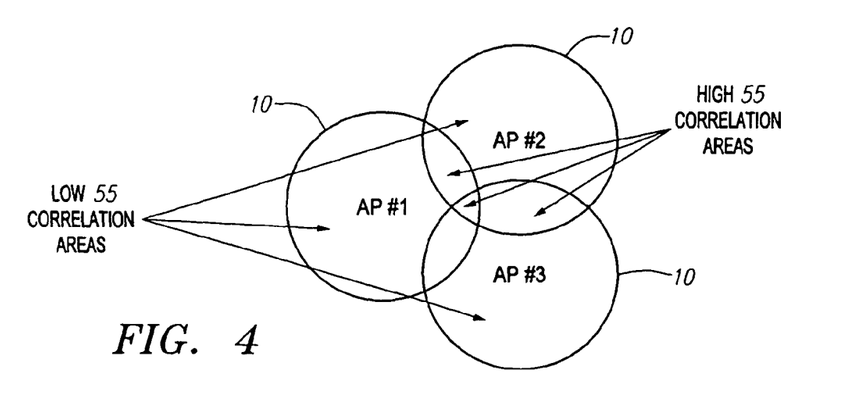
FIG. 4 is an illustration of the coverage areas for three access points indicating regions of relatively low station-to-station spatial signature correlation and regions of relatively high station-to-station spatial signature correlation.

Referring now to FIG. 4, cell 10 (or coverage areas) for three APs (AP#1, AP#2, and AP#3) are illustrated. A first STA (not illustrated) that has low path loss to AP#1 and AP#2 and a second STA (also not illustrated) that has similar low path losses to AP#2 and AP#3 will have low probability of interfering with one another. The location of such STAs is denoted as the low STA-to-STA correlation areas in contrast to the high STA-to-STA correlation areas where STAs have a relatively high probability of interfering with one another. To have low STA-to-STA probability, the sets of low path losses between the STA and the APs should be as orthogonal as possible. The likelihood of such a result is increased when sufficient number of channels between each STA to APs can be estimated (as facilitated by the proposed cross-correlation method and more STAs are served). The ability to estimate STA-to-STA path loss can also be increased if each AP uses a multi-beam antenna, which is the equivalent of increasing the number of APs in the network.

According to another embodiment, estimating STA-to-STA channel gain estimation is based upon the success of previous transmissions. Here, central controller 20 allows an asynchronous transmission. If an expected ACK is not received, then central controller 20 may surmise that there was interference from another station. It may then track these surmised interferences as a probability of interfering. As anticipated packets are missed, central controller 20 may increase the probability of interferences. As they are received, controller 20 may decrease these probabilities. Regardless of how the STA-to-STA gain is estimated, the goal is to simply decrease the probability of interference from asynchronous communication. As is know to those skilled in the art, numerous other methods may be utilized to reduce this probability of interference.

Central controller 20 can only determine the spatial signature matrix (and from this information infer the STA-to-STA interference probability) if all STAs and APs within its network are communicating regularly. The spatial signature of a station is not static. It depends on both the station itself and the environment.

To update the spatial signatures, the central controller may perform a process denoted as probing to discover and update the spatial signatures. For example, central controller 20 may implement a state machine 200 illustrated in FIG. 12 for each STA. Table 1 below describes the states for state machine 200:

TABLE 1

| State | Description |
|---|---|
| EXPIRED | Current spatial signature is invalid. Transition to the EXPIRED AND PROBING state creates a Probing Request event to start the probing process for this STA. |
| EXPIRED AND PROBING | Current spatial signature is invalid. Probing to update current spatial signature is underway. |

TABLE 1-continued

| State | Description |
|---|---|
| EXPIRED AND PROBING FAILED | Current spatial signature is invalid. Probing failed to discover current spatial signature. |
| VALID | Current spatial signature is valid. Transition to the VALID AND PROBING state creates a ProbingRequest event to start the probing process for this STA. |
| VALID AND PROBING | Current spatial signature is valid. Probing to update current spatial signature is underway. |

The transition events are summarized in Table 2 below:

TABLE 2

| Transition Events | Description |
|---|---|
| Signature Request | Generated when spatial signature is needed and current signature is not valid. |
| Probing Success | Generated when probing has been successful and spatial signature has been updated. |
| Probing Failure | Generated when probing has failed. |
| Expire Timer | Generated when current spatial signature has expires. (Default: 5 sec) |
| RevalidateTimer & ActiveSTAFlag | Generated in order to prevent spatial signature from expiring. This is a combination of a timer expiration (Default: 4 sec) and an indication that this station is active. |
| LinkFailure | Generated when MAC determines link is down due to lack of responses from STA. |

Figure 12:
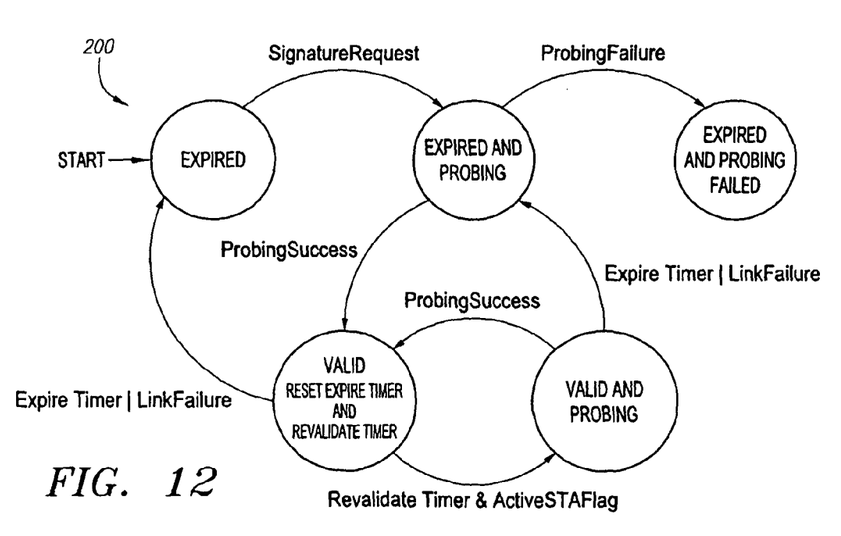
FIG. 12 is a state machine diagram for a probing process according to one embodiment of the invention.

State machine 200 does not include any events that indicate a detection that the signature may have changed. Such an event may be added in alternate embodiments of this state machine. In addition, state machine 200 does not accommodate any resetting of the timers in the event that components of spatial signatures are updated regularly through use of the communication link. In alternate embodiments, the timers may be reset accordingly. Finally, alternate embodiments may be configured to never have a timer expiration. Thus, in such embodiments, polling would only occur based on a detected link failure.

All probing for a STA is initiated via a ProbingRequest event generated by state machine 200. This basic probing process involves selecting an AP, transmitting a packet (such as an RTS) from the selected AP to the STA that is to be polled, and then listening on all APs for the response (for example, an ACK). If there is no response, then another AP may be selected and the process repeated. Once there is a response, then the spatial signature is measured and the probing is completed for this STA. If there is no response from any of the access points, then the probing has temporarily failed. This could occur because the STA has really disappeared or because of interference or other temporary changes in the environment. Thus, it is important to repeat the process with random backoff. The following is an algorithm for probing during a contention free period (CFP).

1.0 Construct Ordered List of APs
   1.1 Using the current spatial signature, determine APs that could last communicate with an STA to be polled. Order these APs by decreasing value of the greatest magnitude response of all beams at each AP.
   1.2 Order remaining APs randomly at end of list.

2.0 Search for STA from APs in Ordered List
   2.1 Remove first AP from ordered list.
   2.2 Send RTS to STA from AP (in an omni-directional fashion using all available antenna beams). All other APs listen (also in an omni-directional fashion) for the RTS and update their AP-AP spatial signatures accordingly. Duration value of the RTS is set to the time required to send one CTS frame plus one SIFS interval.
   2.3 All APs listen (omni-directionally) for CTS.
   2.4 If no CTS is received at any AP, return to step 2.1.
   2.5 If a CTS is received at one or more APs, update the spatial signature accordingly. Then create a ProbingSuccess event and proceed to step 4.0.

3.0 Reschedule Probing
   3.1 Use a random exponential backoff to reschedule probing starting at Step 1.0.
   3.2 If the polled STA has not been discovered after Probing Timeout seconds, give up and create Probing Failure event.

4.0 END

It will be appreciated that the foregoing algorithm may be altered such that only a subset of the available APs listen for a response based on the last known spatial signature. As a result, central controller 20 may, in parallel, probe a number of STAs with disjoint sets of APs. Such an approach may be used when there is no indication of any changes in spatial signature. However, if there was an indication of change, the full probing algorithm may be implemented.

Rather than probe during a contention-free period (CFP), probing may also occur during a contention period (CP). This is more difficult since STAs may contend causing interference in the probing process.

The RTS is a 20 byte MPDU and the CTS is a 16 byte MPDU in 802.11 WLANs. For 802.11a, at 6 Mbps, the packet transmit times are 52 and 42 microseconds, respectively, for RTS and CTS. For 802.11b, at 5.5 Mbps, the packet transmit times are 222 and 213 microseconds, respectively, for RTS and CTS. A successful probe consists of the sum of SIFS (shortest inter-frame sequence)+RTS+SIFS+CTS, for a total time of 126 microseconds for 802.11a and 455 microseconds for 802.11b. It will be appreciated that the total system time spent probing scales linearly with the number of active stations. On the other hand, the time to find a lost station scales linearly with the number of APs. Thus, the full probing algorithm does not scale well. If, however, probing is based upon partial sets of APs as discussed above, the scaling is improved.

Having determined the spatial signature matrix (or channel gain matrix) and related STA-to-STA interferences, central controller 20 may then schedule frame transmissions from its APs to its STAs based upon the expected probability of success for a given transmission. Referring back to FIG. 2, central controller 20 may use its channel gain matrix to perform frame scheduling. Users on a LAN 21 coupled to central controller 20 send frames to central controller 20, which queues the frames. The channel gain matrix contains values for each possible connection between APs 25 and 30 and STAs 35 and 40. For example, G2 represents the gain between STA 35 and AP 25. Should the frame queue contain a first frame destined for STA 35 and a second frame destined for STA 40, central controller 20 may command AP 25 to send the first frame and AP 30 to send the second frame simultaneously if G3 is sufficiently larger than G5, G4, and G1 (for both transmission and ACK) and if G2 is sufficiently larger than G4, G5, and G1. It will be appreciated that "simultaneous" frame transmission denotes the scheduling an AP frame transmission during the duration of another AP's frame transmission. Should central controller 20 decide to command the sequential transmission of the first and second frames, it will command the transmission timing to be such that one STA transmission will not interfere with another STA reception based upon the STA-to-STA gain. The sequential decision would be based upon a given STA not being compatible with other STAs for receiving a simultaneous transmission based upon the channel gain matrix.

Figure 6:
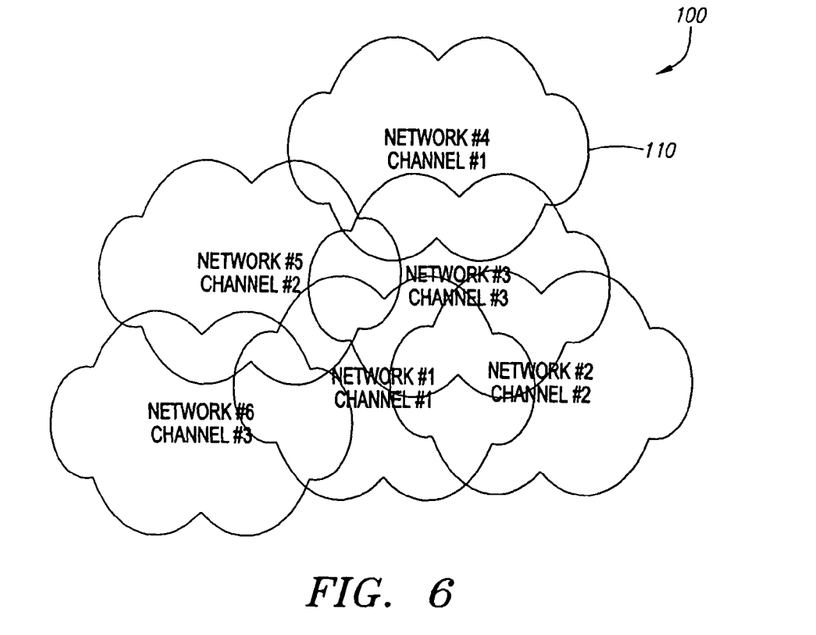
FIG. 6 is an illustration of a plurality of networks according to one embodiment of the invention.

If a given STA is repeatedly found unsuitable for simultaneous service with other STAs in a WLAN, central controller 20 may assign different frequency channels to the "unfitted" given STA. For example, FIG. 6 shows an exemplary network coverage plan 100. Each network 110 operates on an assigned frequency channel such that adjacent networks do not share the same frequency channel. Within each network are multiple APs communicating with multiple STAs as described with respect to FIG. 2. A central controller (not illustrated) controls the frame scheduling and frequency assignments for each network 110. Should the central controller detect that a given STA has been repeatedly found unsuitable for simultaneous transmission with other STAs, the central controller can direct the given STA to a different frequency channel using the application layer agent within the STA. The application layer agent could also set its STA's transmission (TX) power from time to time. In this fashion, the frequency channel assignment is used much more efficiently than in a conventional DCF-based network. Such scalability also lends the present invention to larger networks with increased coverage areas.

When different frame lengths are to be simultaneously transmitted on a downlink to multiple STAs in a given network/frequency assignment, there is a risk that one AP transmitting on downlink may interfere with the ACK coming from an STA in response to a shorter frame receipt. Since the content of the incoming ACK message is well known to the sending AP, the ACK frame may be intercepted using cross-correlation with the known message content at the sending AP. This makes the acknowledgement processes much more robust.

The WLAN transmission period can be divided between downlink and uplink based on traffic load ratio between them. The WLAN may use the PCF sub-period for downlink and DCF period for uplink. In one embodiment, the initial division can be ½ to ½. The uplink portion may then be gradually reduced until its utilization is increased to 100%. Since, in most cases, the traffic on the uplink is expected to be much less intensive than on downlink, and since the WLAN has good knowledge on the amount of traffic expected on the downlink, such an uplink/downlink division can provide flexibility and performance.

Referring back to FIG. 2, with respect to uplink transmissions from STAs 35 and 40, a conventional DCF or PCF regime may be used. If PCF is implemented, the multiple antenna elements for each AP provide for diversity gain and dynamic selection of receiving frames as they do in downlink. Even if conventional DCF would be used on uplink, STAs 35 and 35 will have less interference than in conventional WLANs due to the ability to reduce their transmission power.

In addition, the possibility of lower STA transmit power reduces the probability of uplink suppression. Moreover, each STA 35 and 35 may have a higher effective data rate because the diversity gain improves the link budget. However, to realize diversity gain benefits, the PCF mode should be implemented to assure an AP's best antenna beam is directed to a STA when it transmits.

To achieve the diversity gain benefits, multiple transceivers per AP may be used such that each transceiver demodulates the output of a specific beam. The AP then selects the best beam/antenna element based on the frame's CRC. This arrangement provides for 4-brunch selection diversity, thereby providing a significant performance advantage. An AP receiving multiple uplink frames from STAs operating should select the strongest received frame because central controller 20 will assure that other APs are handling the remaining frames.

Example of a Scheduling Algorithm

The scheduling algorithm implemented by the central controller is designed to operate without complete information about the signal strengths measured at different APs from the various STAs to which it must transmit. The central controller may schedule packets in its packet queue as quickly as possible, by attempting to transmit to as many stations as possible at the same time, based on the available information.

The scheduling algorithm may make use of four basic sets of information:
 1. AP Interaction Table
 2. Station Interaction Table
 3. Signal Strength Table
 4. Transmission History Table The AP Interaction Table comprises the AP-to-AP spatial signature information described previously. Relevant information in the table may include signal strength, beam identification, frequency channel identification, and a time stamp. The Station Interaction Table comprises the STA-to-STA interference data described previously. Each entry may include data indicating whether each pair of stations will likely interfere with one another or allow adequate communication. For example, this table may comprise binary entries (either ones or zeroes), where a 1 indicates stations that may work together without significant interference and a zero indicates stations that interfere with one another at a level unacceptable to the system. Alternatively, the table may include numerical values representing probability of non-interference between two stations. These entries may also include the channel identification and a time stamp.

The Signal Strength Table comprises the AP/STA portion of the spatial signature matrix described previously. Measurements are taken each time a STA transmits in the uplink. After a measurement has been kept for a certain period of time, the measurement is deleted, unless it is the only measurement for that entry. "Old" measurements may be designed as such. Each measurement should include signal strength information measured at all the beams, a measurement quality indicator, frequency channel identification, and a time stamp. The Transmission History Table keeps a history of the downlink transmissions for a period of time. The table includes all simultaneous transmission at a given channel at a given time. The table may include the start of time of the transmitted packet, the AP, beam identification, channel identification, the STA, and whether an ACK was received.

Given the above sets of information, a frame scheduling algorithm according to the invention may proceed as follows. Note that the following is an illustration and not limiting. The central controller forms a packet queue based upon the received packet order and their destinations. A separate queue may be formed for each frequency channel. As a first step, the central controller may examine the oldest packet in the queue and assign a first AP to transmit it by looking up in the Signal Strength Table the AP with the largest signal strength corresponding to the destination station. The central controller may then check the Station Interaction Table for a list of the stations which are non-interfering with the destination station and check the AP Interaction Table for a list of the APs which can operate in a non-interfering manner with the first selected AP. Based upon these examinations, the central controller may pick the non-interfering station which is highest on the Packet Queue, which lists the packets and their respective destinations, and choose one of the non-interfering APs to transmit it that will assure the largest received signal strength. If no non-interfering station can be found, the central processor terminates the search.

Assuming the search has been successful, there are now two stations assigned to two APs. By examining the Signal Strength Table, the central processor may determine the expected C/I for each of the 2 stations. If each C/I is adequate (based on system requirements), the central processor may proceed by checking the Transmission History Table to determine whether there has been a recent simultaneous transmission to these stations, and whether it succeeded or failed. If there was a failure, the central processor may choose a different AP and try again.

Once a workable second station/AP combination has been found, the above process may be repeated to identify a third compatible station/AP combination, and so on. The search process will terminate when no more compatible combinations can be found or when a maximum search time has been reached. At this point, the identified APs may simultaneously transmit to their selected STAs.

The procedure described above is a sequential search which does not attempt to look at all the possibilities. In other words, a particular station is chosen as a starting point, then the first compatible station added, and so on. Accordingly, the scheduling algorithm is essentially moving along a single branch of a complex tree. This procedure is relatively computationally efficient, but has a relatively high probability of terminating with a small number of stations chosen for simultaneous transmission. To increase the average number of simultaneous transmissions, the algorithm may be modified to explore the multiple branches of the tree of possibilities. This can be accomplished by launching multiple instances of the search process at each level of the search. Consider for example the first step of the search wherein the strongest AP is assigned to the station on top of the queue. Instead, the algorithm could consider, for example, the three strongest APs and continue exploring the three branches thus created. Similarly, instead of choosing the first compatible second station, the algorithm could choose several compatible stations, and continue the search from there. These multiple searches lend themselves very well to parallel computation. Thus, the basic algorithm described earlier can be replicated on multiple processors to save computation time.

To further speed up the assignments, the algorithm may use the information collected in these tables to pre-compute various station/AP assignments which are known to be compatible. For example, stations receiving frames from groups of APs which have a large path loss in between them are very likely to be non-interfering. These groups of APs may be identified as "safe" groups. Then, if the algorithm is scheduling frames to multiple stations, each related to a different "safe" AP group, it may immediately assign them to a member of each group. In another embodiment of the algorithm, the Transmission History Table may be examined to prepare lists of station/AP combinations that have been working successfully multiple times in the recent past. Whenever such a combination of stations comes up, the algorithm could schedule frame transmissions immediately. Once a particular combination fails, it is removed from the list.

More generally, a separate table of special cases may be prepared in which an immediate assignment can be made. In parallel with the general search process described earlier, the central controller may perform a separate search process looking for these special cases. Whenever such a special case is detected, a faster decision can be made.

Figure 5A:
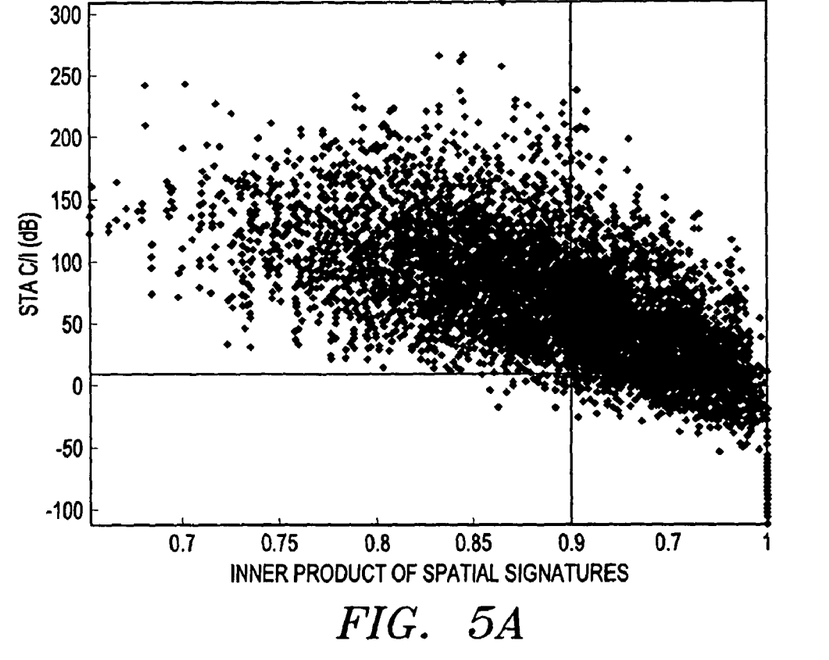
FIG. 5a is a graph of the cross-correlation vs. channel-to-interference ratio (C/I) for a plurality of stations to demonstrate the subset of stations that may be serviced simultaneously according to a cross-correlation threshold of 0.9.
Figure 5B:
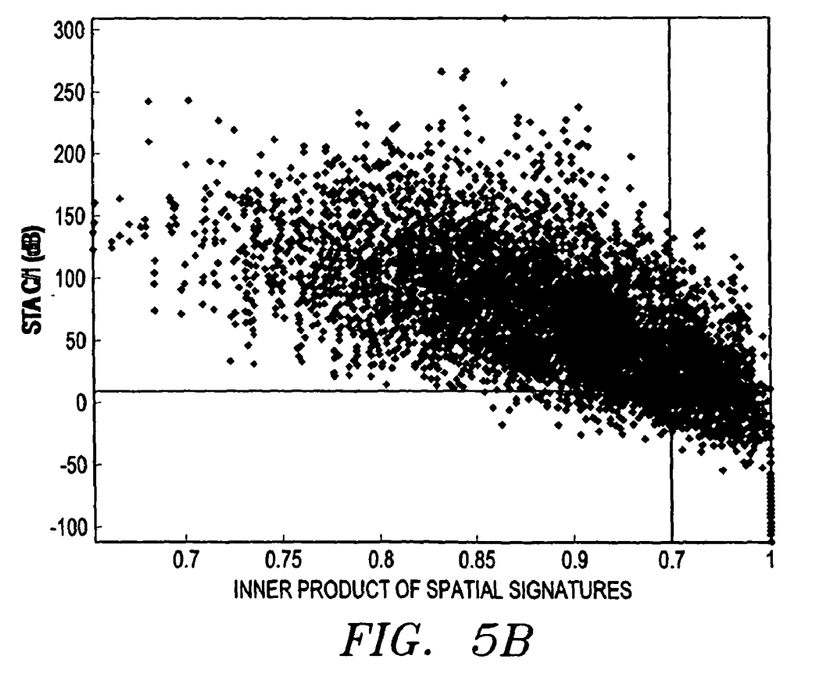
FIG. 5b is a graph of the cross-correlation vs. C/I for a plurality of stations to demonstrate the subset of stations that may be serviced simultaneously according to a cross-correlation threshold of 0.95.

FIG. 5a shows simulation results for a WLAN with 9 APs and 100 randomly distributed STAs, with a 25% probability of transmission path obstructions. The vertical line shows the cross-correlation threshold selected and the horizontal line is the interference threshold represented by 10 dB channel/interference (C/I) conditions at each STA. At a cross-correlation of 0.9, about 50% of the STAs can be selected for simultaneous service since the STA-to-STA interference does not reach 10 dB C/I with less than 0.3% error probability. The number of simultaneously serviceable STAs can be increased by selecting a higher cross correlation threshold. FIG. 5b shows simulation results for the same WLAN in which the spatial signature cross-correlation is increased to 0.95. The percentage of simultaneously serviceable STAs increases to about 75%, with an error probability of about 3%.

The cross correlation threshold can be used as a starting point for adaptive threshold, based on success/failure history. A threshold can be defined for each STA and adjusted up or down depending on the success/failure of frames delivery to that STA. This way an apriori decision on threshold value is not important. Furthermore, an adaptive threshold reduces the need for a highly accurate spatial signature or a spatial signature having a large number of elements. Consequently, much lower cross C/I and signal level measurement dynamic range is required, making most RSSI exiting AP mechanisms suitable for the job.

Examples of AP Embodiments

Figure 7:
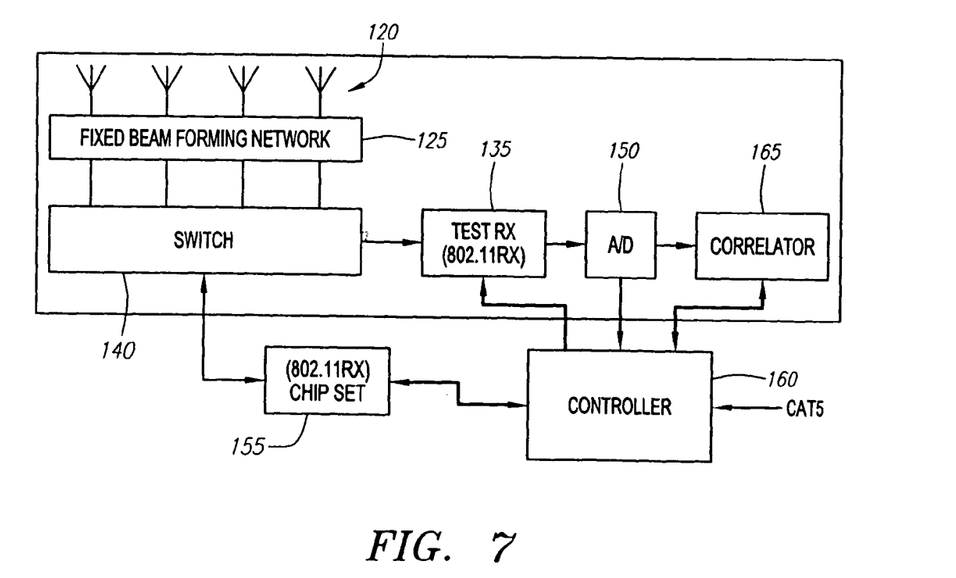
FIG. 7 is a block diagram for an access point module according to one embodiment of the invention.
Figure 8:
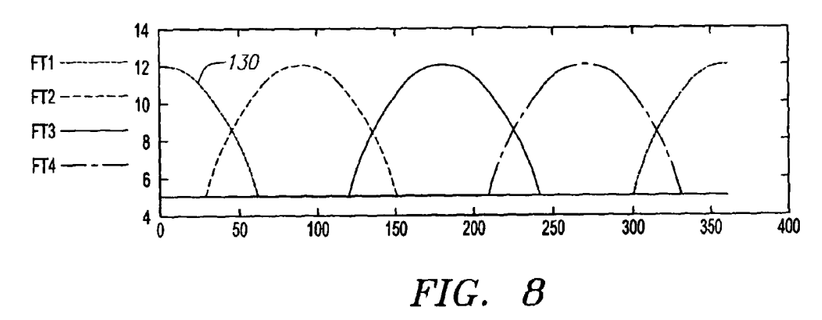
FIG. 8 is an antenna gain plot for the antenna array used in the access point module of FIG. 7.

Turning now to FIG. 7, an exemplary block diagram for an AP is shown. An antenna array 120 in conjunction with a beam forming network 125 such as a Butler matrix forms multiple antenna beams such as antenna beams 130 whose gains are illustrated in FIG. 8. The resulting antenna beams should be orthogonal to one another. Antenna array 120 may be designed for omni-directional or sector coverage depending upon the application. A test receiver 135 scans the antenna array ports through switch 140 to determine the STA responses or SNR at each antenna beam. These responses are used by the central controller to schedule downlink frame transmissions. I and Q samples from an analog-to-digital converter 150 are received by a local AP controller 160 which may perform fast correlation functions using a correlator 165. The fast correlation may be performed using a matched filter on either the preamble or, in the case of an ACK, CTS or related message, the whole frame. An 802.11 chipset 155 performs the required modulation/demodulation and other functions such as MAC.

Figure 9:
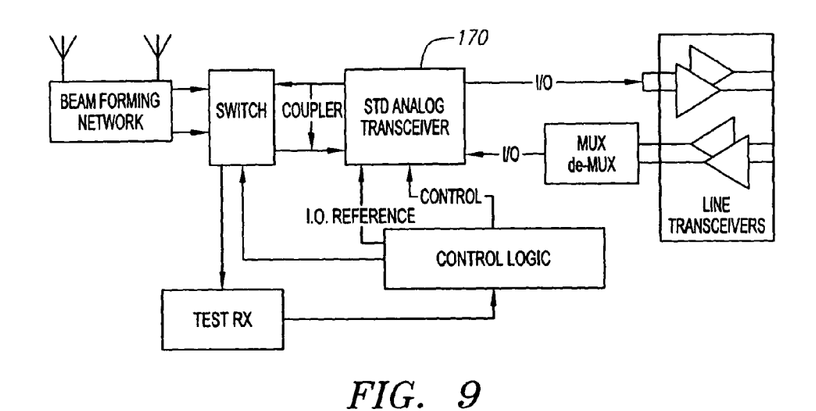
FIG. 9 is a block diagram for an access point module in which the medium access control (MAC) functions are implemented by the central controller according to one embodiment of the invention.

An alternative embodiment for an AP is shown in FIG. 9. Here, the MAC element of the 802.11 chipset has been moved to the central controller, whereby this embodiment may be denoted as a "simple AP." Such an embodiment makes coordination between APs easier. Because the connection between a simple AP and its central controller may be either analog or digital, this connection may carry the modulator output from the MAC within the central controller and the I/Q outputs from a transceiver 170.

Figure 10:
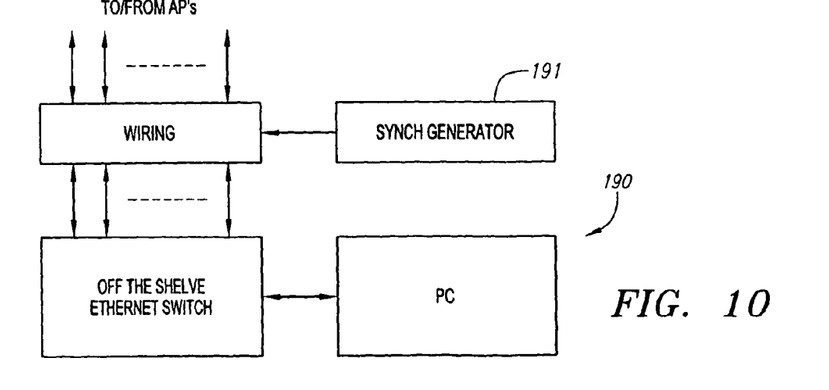
FIG. 10 is block diagram for a central controller for the access point module of FIG. 7.

A block diagram for a central controller 190 for a network in which each AP performs its MAC function (as in FIG. 7) is shown in FIG. 10. In this embodiment, the MAC elements are part of the APs, but the AP transmissions must still be coordinated. Central controller 190 will determine the transmission attributes, but because the MAC at each AP executes the actual transmission, a synch generator 191 should be included. Each AP will use synchronize transmissions according to a synch signal from synch generator 191.

Figure 11:
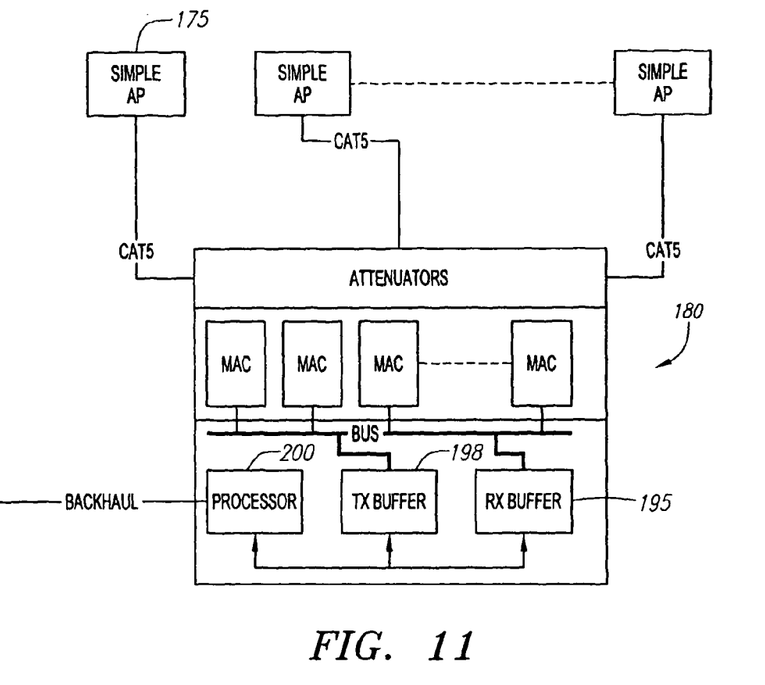
FIG. 11 is a block diagram for a central controller for the access point module of FIG. 9.

In FIG. 11, a central controller 180 having a centralized MAC for simple APs 175 (FIG. 9) is illustrated. To form the channel gain matrix, central controller 180 may gather analog beam responses from simple APs 175 or these beam responses may be measured within simple APs 175 and reported to central controller 180. Central controller 180 uses its channel gain matrix to assign frames to be transmitted to a specific simple AP 175 following its scheduling algorithm as implemented by a processor 200. The frames to be transmitted may be stored in a TX buffer 190 and received frames from STAs may be stored in an RX buffer 195. Processor 200 may decide for each frame in TX buffer 198 what attributes will be used. For example, theses attributes may include the STA destination, STA beam number or array number (should multiple arrays be implemented), time of transmission, TX power, and phase.

It will be appreciated that the frame scheduling algorithms disclosed herein may be subject to many modifications and still schedule frame transmissions based upon a predetermined likelihood of transmission success. Accordingly, although the invention has been described with respect to particular embodiments, this description is only an example of the invention's application and should not be taken as a limitation. Consequently, the scope of the invention is set forth in the following claims.

What is claimed is:

1. A controller for use in a wireless local area network (WLAN) having a plurality of M access point transceivers and a plurality of N stations, wherein each station can communicate with all or a subset of the M access point transceivers, comprising:
   a processor configured to examine transmission characteristics between a subset of the stations and a subset of one or more antenna elements for each access point transceiver and, based upon the transmission characteristics, to identify frames that are scheduled for simultaneous transmission based on at least one of the examined transmission characteristics,
   wherein the transmission characteristics include transmission characteristics derived from a cross correlation of packet transmissions from the subset of the stations.

2. The controller of claim 1, wherein the simultaneous transmission is from a subset of the access points to the subset of the stations.

3. The controller of claim 1, wherein the frames are scheduled for simultaneous transmission based upon a probability of successful transmission and on a maximum aggregated data rate in the network, as determined by the transmission characteristics.

4. The controller of claim 3, wherein the transmission characteristics include a prediction of signal to interference ratios at the stations and access points.

5. The controller of claim 1, wherein the transmission characteristics comprise probability of station to station interference, access point transceiver to station path loss, and access point to access point path loss information.

6. The controller of claim 1, wherein the transmission characteristics further comprise station to station path loss information.

7. The controller of claim 1, further configured to command each station to transmit periodically so that the transmission characteristics may be updated.

8. The controller of claim 1, further configured to delay the subset of access points from transmitting the identified frames to the intended stations based on the transmission characteristics.

9. The controller of claim 1, wherein the transmission characteristics comprise a probability of interference from a first station to a second station determined by a spatial signature similarity between the first and second station and a comparison between the similarity and a fixed threshold.

10. The controller of claim 1, wherein the transmission characteristics comprise a probability of interference from a first station to a second station determined by a spatial signature similarity between the first and second station and a comparison between the similarity and a threshold that can be adjusted based on frame error and re-transmission rate.

11. The controller of claim 1, wherein the frames can be transmitted at different transmit powers based on a scheduling of the frames.

12. A method of scheduling frame transmissions in an 802.11 wireless local area network (WLAN), wherein the WLAN includes a plurality of M access points, and a plurality of N stations, wherein each station can communicate with all or at least one of the M access points, comprising:
   receiving a set of frames for transmission to intended stations within the plurality of N stations;
   examining transmission characteristics between a subset of the stations and a subset of the antenna arrays for the access points, wherein the transmission characteristics include transmission characteristics derived from a cross correlation of packet transmissions from the subset of the stations;
   based upon the transmission characteristics, identifying frames within the set of frames that are simultaneously transmitted; and
   transmitting the identified frames from a subset of the M access points to their intended stations.

13. The method of claim 12, where the set of frames are transmitted on a same frequency channel.

14. The method of claim 12, wherein the transmission characteristics are selected from one of: channel gains between the access points and stations, channel gains between one access point and remaining ones of the access points, probability of station to station interference, access point transceiver to station path loss, access point to access point path loss, and station to station path loss information.

15. The method of claim 12, further comprising adjusting transmits power in transmitting the frames from the subset of access points based on the transmission characteristics.

16. The method of claim 12, further comprising sequentially transmitting the frames based on the transmission characteristics.

17. The method of claim 12, further comprising delaying transmitting one of the subset of frames based on the transmission characteristics.

18. The method of claim 12, further comprising queuing a sequence of frames to be transmitted by the access points.

19. The method of claim 12, further comprising polling the stations when an uplink transmission has not occurred for a specified period of time.

20. A controller for use in a wireless local area network (WLAN) having a plurality of M access point transceivers and a plurality of N stations, wherein each station can communicate with all or a subset of the M access point transceivers, comprising:
   a processor configured to examine transmission characteristics between a subset of the stations and a subset of one or more antenna elements for each access point transceiver and, based upon the transmission characteristics, to identify frames that are scheduled for simultaneous transmission based on at least one of the examined transmission characteristics,
   wherein the identified frames are scheduled for simultaneous transmission based upon a probability of successful transmission.

* * * * *